Feb. 22, 1955  A. J. ROUBAL  2,702,634
CARTRIDGE TYPE MECHANISM FOR VIBRATING SCREENS AND THE LIKE
Filed April 24, 1953  2 Sheets-Sheet 2
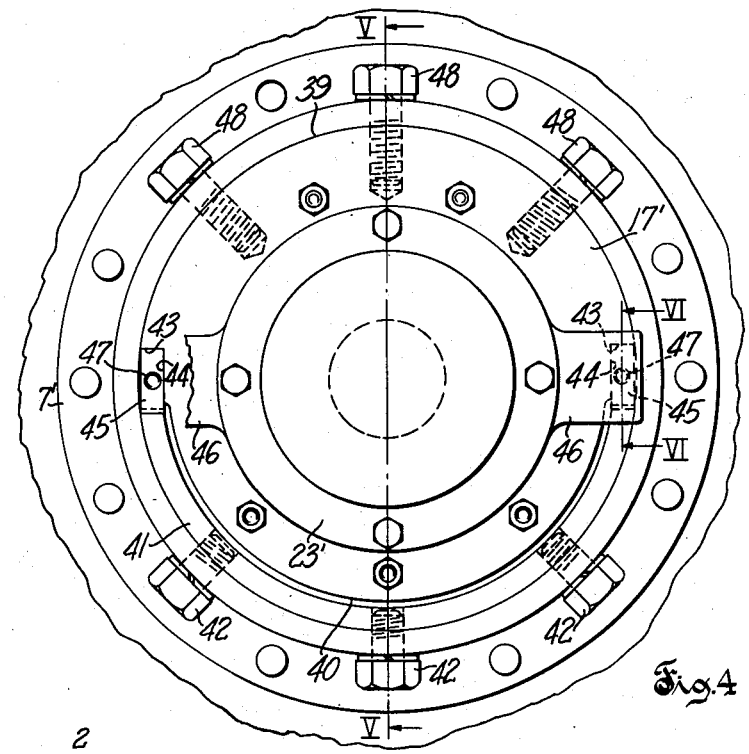
Fig. 4
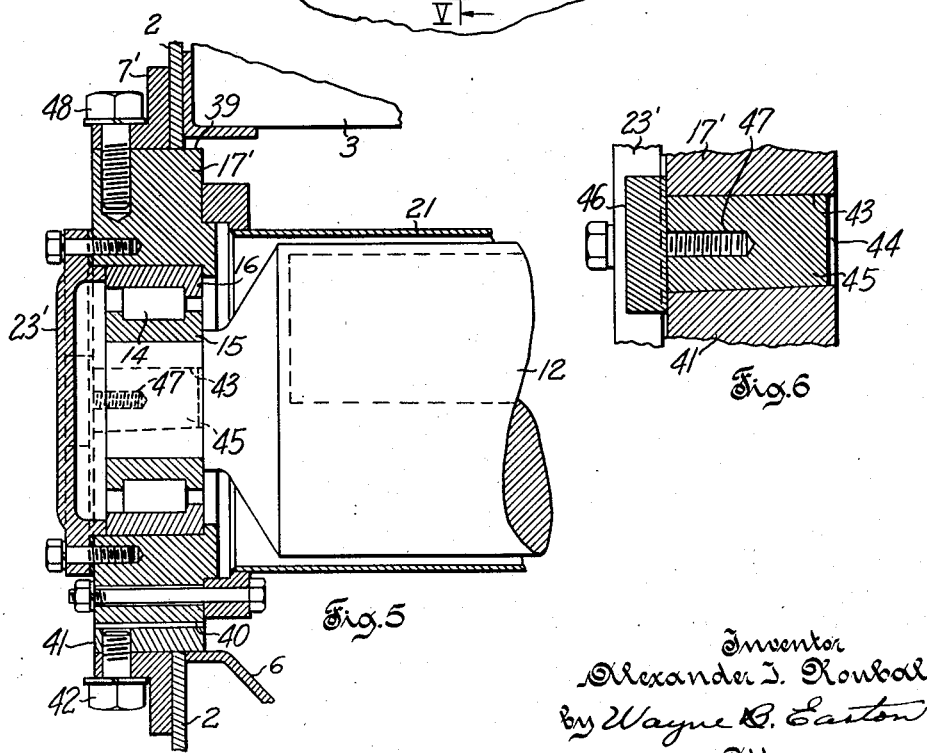
Fig. 5
Fig. 6
Inventor
Alexander J. Roubal
by Wayne B. Easton
Attorney

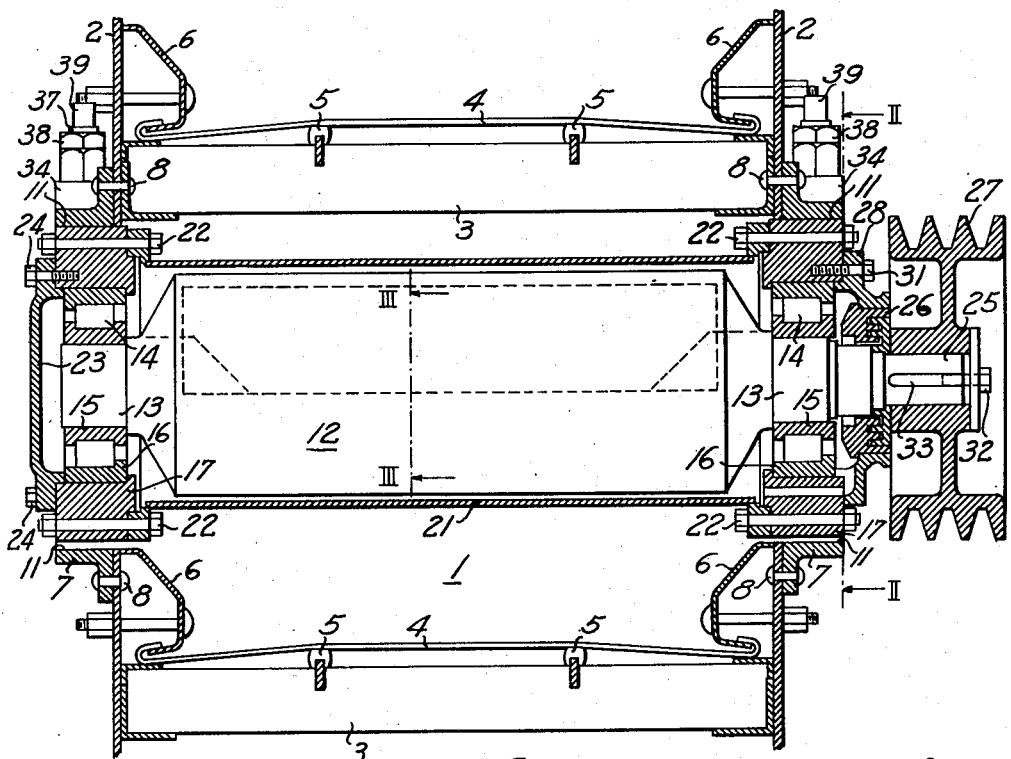
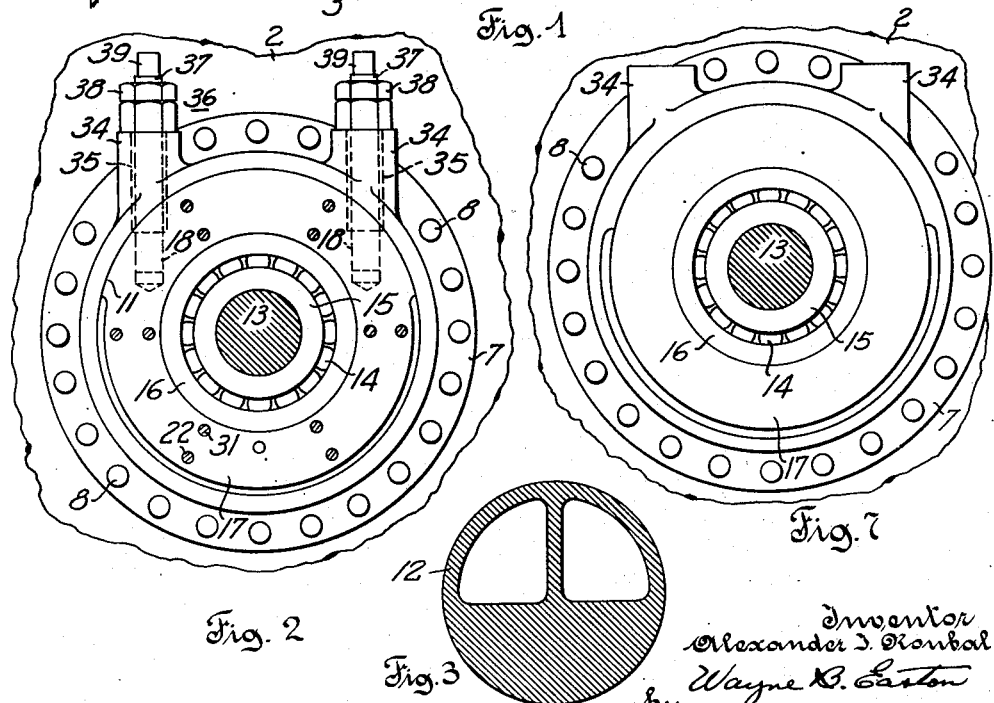

United States Patent Office 2,702,634
Patented Feb. 22, 1955

2,702,634

CARTRIDGE TYPE MECHANISM FOR VIBRATING SCREENS AND THE LIKE

Alexander J. Roubal, Milwaukee, Wis., assignor to Allis-Chalmers Manufacturing Company, Milwaukee, Wis.

Application April 24, 1953, Serial No. 350,955

10 Claims. (Cl. 209—367)

This invention relates generally to a cartridge type vibrating mechanism and bearing mounting for vibrating machinery and more specifically to an improved cartridge type vibrating mechanism having a limited arc of contact with a housing and an improved bearing mounting for mounting the mechanism in a vibrating screen.

The machine will ordinarily comprise a vibratable body with a pair of spaced opposite side plates to which forces are transmitted through bearings from a vibrating mechanism having a rotating unbalanced rotor.

In many cases it is desirable to mount the vibrating mechanism in such a way that the rotor extends between bearings in the side plates. The shaft and bearings should be protected by a dust housing which in many cases in the past has been rigidly and permanently attached to the side plates as a transverse spacer tube element. However, when such a construction is used, any repairs to the mechanism involve opening the end seals of the mechanisms at the machine and removing the bearing so that the shaft may be withdrawn. This requires appreciable down time for repairs, down time being defined as the time the mechanism is not operating.

It has been found advantageous to be able to remove the vibrating mechanism, that is the rotor, bearings and supporting housing as a sealed or cartridge unit, not only for removal for repairs but also to make possible reversability and interchangeability of whole mechanisms to apply different drives and to change the amplitude of vibration. It is also valuable to be able to assemble and seal the mechanism independently of the machine body to be vibrated and then merely insert the mechanism as a cartridge unit into the body. This has the further advantage of reducing the down time of the vibrating machine resulting in increased economy of operation.

Cartridge vibrating mechanisms have been devised in the past. Difficulty, however, has been encountered in devising satisfactory means for securely mounting the cartridge vibrating mechanism, particulary when it must fit into openings in both side plates and extend across the machine at approximately the center of gravity. Ordinary means for securement did not prove satisfactory. Clamping radially had a tendency to shrink or collapse the bearing receiving seats, causing bearing trouble, and in addition made necessary undesirably close tolerances in manufacture to control side to side dimensions. The use of ordinary bolted flanged connections necessitated making a side hole large enough to permit the flange on one end of the cartridge to pass therethrough which resulted in the cartridge being insertable in a finished body from only one side. This made it necessary to use a larger flange on one end than the other and to bolt the smaller flange inside one side plate and the larger flange outside the other side plate.

The present invention has as an object an improved cartridge vibrating mechanism devised with cylindrical housing ends which are freely insertable in supporting side plates from either side through suitable openings in both side plates.

It is also an object of this invention to provide the mechanism with means for securing the cartridge in place without exerting any compression upon the bearings.

A further object of this invention is to provide means for securing the cartridge in supporting side plates in a manner that does not require the spacing of the side plates to be held to close tolerance.

Another object of this invention is to provide an improved cartridge vibrating mechanism which will afford a reduction in the down time of a vibrating machine.

The following is a full clear and concise description of the invention and the best mode devised by the inventor for putting the same into practical effect. Reference is had in the description to the accompanying drawing, in which:

Fig. 1 is a vertical transverse sectional view of a vibratory screen taken through a longitudinal axis of its unbalanced rotor;

Fig. 2 is an end view partly in cross section taken along line II—II in Fig. 1;

Fig. 3 is a cross section view of an unbalanced rotor taken along line III—III in Fig. 1;

Fig. 4 is an end view similar to the view shown in Fig. 2 illustrating alternative means for mounting a cartridge assembly;

Fig. 5 is a transverse sectional view taken along line V—V in Fig. 4;

Fig. 6 is a fragmentary view in section, taken along line VI—VI in Fig. 4; and

Fig. 7 is an end view similar to the view shown in Fig. 2 illustrating another embodiment of the invention.

The improved cartridge type mechanism or unit of this invention is illustrated as being applied to a vibrating screen 1 as shown in Fig. 1. The screen 1 comprises a pair of oppositely spaced side plates 2 connected by a screen body 3 secured thereto in any suitable manner. A screen surface 4 is supported by buffer strips 5 and is fastened to the screen body 3 by means of clamping plates 6. The screen 1 in this instance is provided with two decks or screen surfaces 4. The side plates 2 have aligned circular openings sufficiently large to allow the cartridge mechanism to pass through. Bearing mountings shown as an annular member 7, although any other shaped member may be used, circumvent the openings in the side walls and are fastened to the side walls by means such as rivets 8. The annular members 7, which form a supporting seat 11 for the cartridge mechanism, may have circular center holes machined to a slightly larger diameter than the largest diameter of the cartridge unit as shown in Fig. 2, or the holes in the annular members 7 may be noncircular with over 180° of the inner peripheral surface having an increased radius as shown in Fig. 7.

Referring to Fig. 1, the cartridge type mechanism is shown fitted into the center holes of the annular members 7. An unbalanced rotor having a cross section as shown in Fig. 3 although it may be of any other type, has cylindrical shaft end portions 13 journaled into antifriction bearings 14. The particular cross section shown in Fig. 3 is further described and is claimed in the copending application of Mathew P. Hahn, S. N. 327,837. The bearings 14 are of the usual roller bearing type having an inner race 15 and an outer race 16. The bearings 14 are journaled in a bearing housing shown as a mounting part 17. The outer periphery of the mounting part 17 may be circular as shown in Fig. 7 or noncircular as shown in Fig. 2 with over 180° of the peripheral surface having a reduced radius to permit easy insertion of the cartridge mechanism into the annular member 7. It is to be understood that the outer periphery of the mounting part 17 may be of any other suitable shape such as rectangular or triangular. A pair of tapped holes 18 as shown in Fig. 2, although any number may be used, are formed in the portion of the mounting part 17 having the greatest radius. A housing here shown as hollow cylinder 21 capable of holding oil encloses the unbalanced rotor 12 and is fastened in an oil tight fit to the mounting part 17 by means such as nuts and bolts 22. A cylindrical cover plate 23 is fastened to the other side of one of the mounting parts by cap screws 24 or similar means. One end of the rotor 12 has a shaft extension 25, which is journaled into a labyrinth seal 26, and a pulley 27. The labyrinth seal 26 is held in place by an annular seal plate 28 which is fastened to one side of the mounting part 17 as by cap screws 31. The pulley 27, which is illustrated as a V-belt pulley, is attached to the end of the rotor shaft 25 by any suitable means such as a cap screw 32 and a key 33.

The annular members 7 have a pair of built up boss portions 34 as shown in Fig. 2, although any number may be used. The boss portions 34 have bored vertical elongated holes 35 in alignment with the tapped holes 18 in the mounting part 17. A clamping device 36 comprises a threaded bolt 37 having a head 39 shaped to cooperatively engage a wrench, and lock nuts 38 cooperating with the threaded bolt. The threaded bolt passes through a bored hole 35 in the boss portion 34 and engages the tapped hole 18 in the housing to hold the cartridge mechanism in place. The clamping device 36 exerts sufficient pressure to hold and prevent rotation of the cartridge mechanism without transmitting the pressure to the bearings 14, thus prolonging the bearing life. The elongated holes 35 in the boss portions 34 permit axial movement of the cartridge mechanism to locate the tapped holes 18 in the mounting part 17 so that side to side dimensions of the mechanism need not be held to a close tolerance.

In the embodiment of Fig. 2, the portion of the mounting part 17 having the greatest radius is secured to the upper portion of the annular member 7. The mounting part 17 may, however, be placed in any other position.

Although Fig. 2 of the drawing illustrates vertical clamping bolts 37 for clamping a mounting part 17 to an annular member 7 in the device shown in Fig. 1, other means for clamping the mounting part 17 to the annular member 7 may be used such as a plurality of radial bolts 48 shown in Figs. 4 and 5.

In the alternative means for mounting a cartridge mechanism as is shown in Figs. 4, 5 and 6, an annular member 7' has attached thereto a partial positioning ring 41. The partial ring 41 is attached to the annular member 7' by means such as bolts 42. A mounting part 17' is journaled into the annular member 7'. The outer periphery of the mounting part 17' is substantially annular, with one arcuate portion 39 of the outer periphery having a greater radius than arcuate portion 40. The ends of the arcuate portions 39, 40 are connected by substantially radial seat portions 43 and perpendicular face portions 44. The arcuate portion 40 of the mounting part 17' faces the compression ring 41 and has a smaller radius than the ring 41 to provide a clearance permitting easy insertion of the mounting part 17' into the annular member 7'. As shown in Figs. 4 and 6, the mounting part 17' is secured in firm engagement to the annular member 7' by tapered keys 45 which are inserted between the ends of partial ring 41 and seat portions 43 in suitable slots formed by the seat portions 43, face portions 44, opposite ends of the partial ring 41 and annular member 7'. The keys 45 may be locked in place after the mounting part 17' is clamped into position by any suitable means such as a cover plate 23' having extended flange portions 46. The keys 45 each have a tapped hole 47 into which a bolt may be screwed to facilitate removing the keys 45 when it is desired to remove the cartridge unit. As the partial ring 41 is attached to annular member 7', rotation of the cartridge unit is prevented when tapered keys 45 are in securing position. To insure nonrotation of the cartridge unit the keys 45 may be supplemented by a plurality of radial bolts 48 connecting the arcuate periphery of the mounting part 17' to the annular member 7'.

The procedure involved in removing and inserting a cartridge unit into a vibrating machine will now be explained. Assuming the bearings of the vibrating screen shown in Fig. 1 are defective, the cartridge unit comprising the unbalanced rotor, the bearings and the supporting housing is removed from the machine in the following manner. The lock nuts 38 are unscrewed and the bolts 37 are withdrawn from the mounting part 17 by means of a wrench releasing the mounting part 17 from the annular member 7. The cartridge unit is in a position to be slidably removed from the annular members 7 of the vibrating screen by suitable equipment. Having removed the defective unit, a substitute unit may be inserted in the annular members 7 and positioned so that the tapped holes 18 in the mounting part 17 are in alignment with the elongated holes 35 in the boss portions 34. The bolts 37 are inserted in the holes 35 to engage the tapped holes 18. The bolts 37 are tightened by means of a wrench to draw up and firmly secure the mounting part 17 of the cartridge unit to the annular members 7. The bolts 37 are locked in place by the lock nuts 38 and the vibrating screen is ready for operation.

In the embodiment of Fig. 2, the mounting part 17 is shown as having a portion of the outer periphery at a reduced radius to permit easy insertion of the mounting part 17 into the annular ring 7. The annular ring 7 is shown as having a circular inner peripheral surface cooperating with the outer periphery of the mounting part 17. It is to be understood that easy insertion of the mounting part 17 into the annular ring 7 could be provided by having the mounting part 17 circular and journaled into a noncircular annular ring 7 having a portion of the inner peripheral surface of increased radius, shown as a third embodiment in Fig. 7.

Although only three embodiments of the present invention have been illustrated and described herein, it will be apparent to one skilled in the art that various changes or modifications may be made therein without departing from the essence of the invention or from the scope of the appended claims.

It is claimed and desired to secure by Letters Patent:

1. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: a mounting part having an outer periphery of a radial extent at least equal to the maximum radial extent of said unit, said mounting part supportingly surrounding a bearing structure operatively journaling an end portion of said unit; the outer periphery of said mounting part and said wall surface of one of said openings presenting coextensive complementary first and second portions, said second portions being spaced from each other to provide clearance therebetween substantially coextensive with the peripheral extent of said second portions; and releasable means securing said mounting part to the member containing said one opening with said first portion of said mounting part fixedly abutting said first portion of said wall surface.

2. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: a mounting part having an outer periphery of a radial extent at least equal to the maximum radial extent of said unit, said mounting part supportingly surrounding a bearing structure operatively journaling an end portion of said unit; the outer periphery of said mounting part and said wall surface of one of said openings presenting coextensive complementary first and second portions with said first portions having a circumferential extent of less than 180°, said second portions being spaced from each other to provide clearance therebetween substantially coextensive with the peripheral extent of said second portions; and releasable means securing said mounting part to the member containing said one opening with said first portion of said mounting part fixedly abutting said first portion of said wall surface.

3. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: a mounting part having an outer periphery of a radial extent at least equal to the maximum radial extent of said unit, said mounting part supportingly surrounding a bearing structure operatively journaling an end portion of said unit, said mounting part presenting an outer periphery including a first portion complementary to a first portion of the wall surface defining said one opening, and a second portion of said mounting part radially relieved to provide clearance between said mounting part and the remainder of said wall surface; and releasable means securing said mounting part to the member containing said one opening with said first portion of said mounting part fixedly abutting said first portion of said wall surface.

4. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: an annular mounting part having an outer periphery of a radial extent at least equal to the maximum radial extent of said unit, said mounting part supportingly surrounding a bearing structure operatively journaling an end portion of said unit; the outer periphery of said mounting part and said wall surface of one of said openings presenting coextensive complementary first and second portions with said first portions having a circumferential extent less than 180°, and said second portions comprising the remainder of said outer periphery of said mounting part and said wall surface with said second portions being spaced from each other to provide clearance therebetween substantially coextensive with the peripheral extent of said second portions; and releasable means securing said mounting part to the member containing said one opening with said first portion of said mounting part fixedly abutting said first portion of said wall surface.

5. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: an annular mounting part having an outer periphery of a radial extent at least equal to the maximum radial extent of said unit, said mounting part supportingly surrounding a bearing structure operatively journaling an end portion of said unit, said mounting part presenting an outer periphery including a first portion having an arcuate seating surface less than 180° in circumferential extent, said seating surface being complementary to a first portion of the wall surface defining said one opening, and a second portion of said mounting part radially relieved to provide clearance between said annular mounting part and the remainder of said wall surface; and releasable means securing said mounting part to the member containing said one opening with said first portion of said mounting part fixedly abutting said first portion of said wall surface.

6. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: an annular mounting part having an outer periphery of a radial extent at least equal to the maximum radial extent of said unit, said mounting part supportingly surrounding a bearing structure operatively journaling an end portion of said unit, said mounting part presenting an outer periphery including a first portion having an arcuate seating surface less than 180° in circumferential extent, said seating surface being complementary to a first portion of the wall surface defining said one opening, and a second portion of said mounting part comprising the remainder of said outer periphery of said mounting part radially relieved to provide clearance between said annular mounting part and the remainder of said wall surface; and releasable means securing said mounting part to the member containing said one opening with said first portion of said mounting part fixedly abutting said first portion of said wall surface.

7. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: a mounting part having an outer periphery of a radial extent at least equal to the maximum radial extent of said unit, said mounting part supportingly surrounding a bearing structure operatively journaling an end portion of said unit; an annular member surrounding one of said openings of said support members, said annular member defining an opening; said mounting part presenting an outer periphery including a first portion complementary to a first portion of the inner periphery of said annular member, and a second portion of said mounting part radially relieved to provide clearance between said mounting part and the remainder of said inner periphery of said annular member; and releasable means securing said mounting part to said annular member with said first portion of said mounting part fixedly abutting said first portion of the inner periphery of said annular member.

8. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: an annular mounting part having an outer periphery of a radial extent at least equal to the maximum radial extent of said unit, said mounting part supportingly surrounding a bearing structure operatively journaling an end portion of said unit; an annular member surrounding one of said openings of said support members, said annular member defining an opening; said mounting part presenting an outer periphery including a first portion having an arcuate seating surface less than 180° in circumferential extent, said seating surface being complementary to a first portion of the inner periphery of said annular member, and a second portion of said mounting part comprising the remainder of said outer periphery of said mounting part radially relieved to provide clearance between said mounting part and the remainder of said inner periphery of said annular member; and releasable means securing said mounting part to said annular member with said first portion of said mounting part fixedly abutting said first portion of the inner periphery of said annular member.

9. In a vibratory screen construction and the like having at least a pair of spaced support members each having a wall surface defining axially aligned openings therein, and having a vibratory unit of generally tubular form dimensioned for axial insertion and removal through at least one of said openings, the combination comprising: an annular mounting part having an outer periphery of a radial extent at least equal to the maximum radial extent of said unit, said mounting part supportingly surrounding a bearing structure operatively journaling an end portion of said unit; an annular member surrounding one of said openings of said support members, said annular member defining an opening; said mounting part presenting an outer periphery including a first portion having an arcuate seating surface less than 180° in circumferential extent, said seating surface being complementary to a first portion of the inner periphery of said annular member, said annular member being formed with holes extending through said first portion, and a second portion of said mounting part comprising the remainder of said outer periphery of said mounting part radially relieved to provide clearance between said annular mounting part and the remainder of said inner periphery of said annular member; and releasable means extending through said holes of said annular member for securing said mounting part to said annular member with said first portion of said mounting part fixedly abutting said firrst portion of the inner periphery of said annular member.

10. In a vibrator for screens and the like: a pair of spaced parallel side walls each having a wall surface defining aligned openings in the side walls; a partial ring of substantially 180° circumferential extent mounted on the wall surface defining one of said openings; a tubular vibratory unit journaled in said openings in said side walls, the tubular unit having a mounting part adjacent each of its ends, said mounting part having an outer diameter larger than the tubular element, said mounting part having an external arcuate seat portion of less than 180° circumferential extent and of radius substantially equal to said one side wall opening, said mounting part having the remainder of its external peripheral surface facing said partial ring and relieved to a smaller radius than the inner radius of said partial ring, and securing means comprising tapered keys inserted between said seat portion and said partial ring to push said seat portion outwardly into firm engagement with the surface of said side wall opening.

No references cited.